(12) United States Patent
Kanei et al.

(10) Patent No.: US 11,168,620 B2
(45) Date of Patent: Nov. 9, 2021

(54) GAS SUPPLY SYSTEM

(71) Applicant: Kobe Steel, Ltd., Hyogo (JP)

(72) Inventors: Naofumi Kanei, Takasago (JP); Kenji Nagura, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 336 days.

(21) Appl. No.: 16/416,431

(22) Filed: May 20, 2019

(65) Prior Publication Data

US 2019/0368426 A1 Dec. 5, 2019

(30) Foreign Application Priority Data

Jun. 1, 2018 (JP) .............................. JP2018-106142

(51) Int. Cl.
*F02C 9/40* (2006.01)
*F01D 15/10* (2006.01)
*F02C 6/00* (2006.01)
*F02C 9/38* (2006.01)
*F17C 7/04* (2006.01)
(Continued)

(52) U.S. Cl.
CPC ................ *F02C 9/40* (2013.01); *F01D 15/10* (2013.01); *F02C 6/00* (2013.01); *F02C 9/38* (2013.01); *F17C 7/04* (2013.01); *F17C 9/02* (2013.01); *C01B 3/00* (2013.01); *F05D 2270/061* (2013.01); *F17C 2221/012* (2013.01); *F17C 2221/033* (2013.01); *F17C 2223/0161* (2013.01); *F17C 2227/0135* (2013.01); *F17C 2227/0157* (2013.01); *F17C 2227/0318* (2013.01); *F17C 2227/0341* (2013.01); *F17C 2227/0393* (2013.01); *F17C 2265/025* (2013.01); *F17C 2265/034* (2013.01); *F17C 2265/05* (2013.01); *F17C 2270/0581* (2013.01)

(58) Field of Classification Search
CPC ...... F02C 9/40; F02C 9/38; F02C 6/00; F01D 15/10; F17C 7/04; F17C 9/02; F17C 2221/012; F17C 2221/033; F17C 2223/0161; F17C 2265/025; F17C 2265/022; F17C 2265/03; F17C 2265/031; C01B 3/00
USPC ......................................................... 62/48.1
See application file for complete search history.

(56) References Cited

U.S. PATENT DOCUMENTS

2011/0185748 A1* 8/2011 Fuchs ...................... F17C 9/02
62/50.2
2014/0290279 A1* 10/2014 Lee ........................ F25J 1/0277
62/48.2

(Continued)

*Primary Examiner* — Joel M Attey
(74) *Attorney, Agent, or Firm* — Studebaker & Brackett PC

(57) ABSTRACT

A gas supply system includes a first tank, a first path into which a first gas generated by vaporization of a first low-temperature liquefied gas flows, a gas boosting mechanism being disposed in the first path, a second path that is a path configured to extract the first low-temperature liquefied gas from the first tank, a pump and a vaporization mechanism being disposed in the second path and a reliquefaction path that is a path configured to liquefy at least part of the first gas extracted from an upstream side of the gas boosting mechanism in the first path and to cause the liquefied first gas to flow into an upstream side of the pump in the second path, a cooling heat exchanger configured to cool the first gas by a second low-temperature liquefied gas or a second gas being disposed in the reliquefaction path.

4 Claims, 2 Drawing Sheets

(51) Int. Cl.
 *F17C 9/02* (2006.01)
 *C01B 3/00* (2006.01)

(56) References Cited

U.S. PATENT DOCUMENTS

2017/0074163 A1   3/2017  Ikeda et al.
2018/0313497 A1*  11/2018 Nardis .................... F17C 7/00

* cited by examiner

GAS SUPPLY SYSTEM

TECHNICAL FIELD

The present invention relates to a gas supply system.

BACKGROUND ART

Conventionally, as disclosed in Japanese Patent Application Laid-Open No. 2015-187049, a gas supply system that supplies a mixed gas obtained by mixing a natural gas and a hydrogen gas to a predetermined demander is known. The gas supply system disclosed in Japanese Patent Application Laid-Open No. 2015-187049 supplies a mixed gas obtained by mixing a hydrogen gas generated by a dehydrogenation reaction of organic hydride and a natural gas, as fuel, to a combustor of a gas turbine power generation unit. In this combustor, a combustion gas of high temperature and high pressure is generated by burning the mixed gas (gas including hydrogen gas and natural gas) by using separately supplied compressed air. Then, the combustion gas rotates the gas turbine, and rotational energy of the gas turbine is converted into electric energy by a generator.

In the gas supply system as disclosed in Japanese Patent Application Laid-Open No. 2015-187049, it may be necessary to supply a gas such as a natural gas or a hydrogen gas to a predetermined demander after boosting the gas to predetermined pressure. The inventors have assumed such a situation and focused on a problem of improving efficiency of the entire system by minimizing energy of the entire gas supply system necessary for obtaining the gas boosted to predetermined pressure.

SUMMARY OF INVENTION

An object of the present invention is to provide a gas supply system capable of increasing gas supply efficiency in a gas supply system that supplies a gas boosted to predetermined pressure to a demander.

According to one aspect of the present invention, a gas supply system supplies a demander with a mixed gas obtained by mixing a first gas generated by vaporization of a first low-temperature liquefied gas and a second gas generated by vaporization of a second low-temperature liquefied gas that is lower in temperature than the first low-temperature liquefied gas. The gas supply system includes a first tank configured to store the first low-temperature liquefied gas, a first path into which the first gas generated by vaporization of the first low-temperature liquefied gas in the first tank flows, a gas boosting mechanism configured to boost the first gas being disposed in the first path, a second path that is a path configured to extract the first low-temperature liquefied gas from the first tank, a pump configured to boost the first low-temperature liquefied gas and a vaporization mechanism configured to vaporize the first low-temperature liquefied gas boosted by the pump being disposed in the second path and a reliquefaction path that is a path configured to liquefy at least part of the first gas extracted from an upstream side of the gas boosting mechanism in the first path and to cause the liquefied first gas to flow into an upstream side of the pump in the second path, a cooling heat exchanger configured to cool the first gas by the second low-temperature liquefied gas or the second gas being disposed in the reliquefaction path.

The present invention can increase gas supply efficiency in the gas supply system that supplies gas boosted to predetermined pressure to a demander.

DESCRIPTION OF EMBODIMENTS

A gas supply system according to an embodiment of the present invention will be described in detail below with reference to the drawings.

First Embodiment

Figure 1:
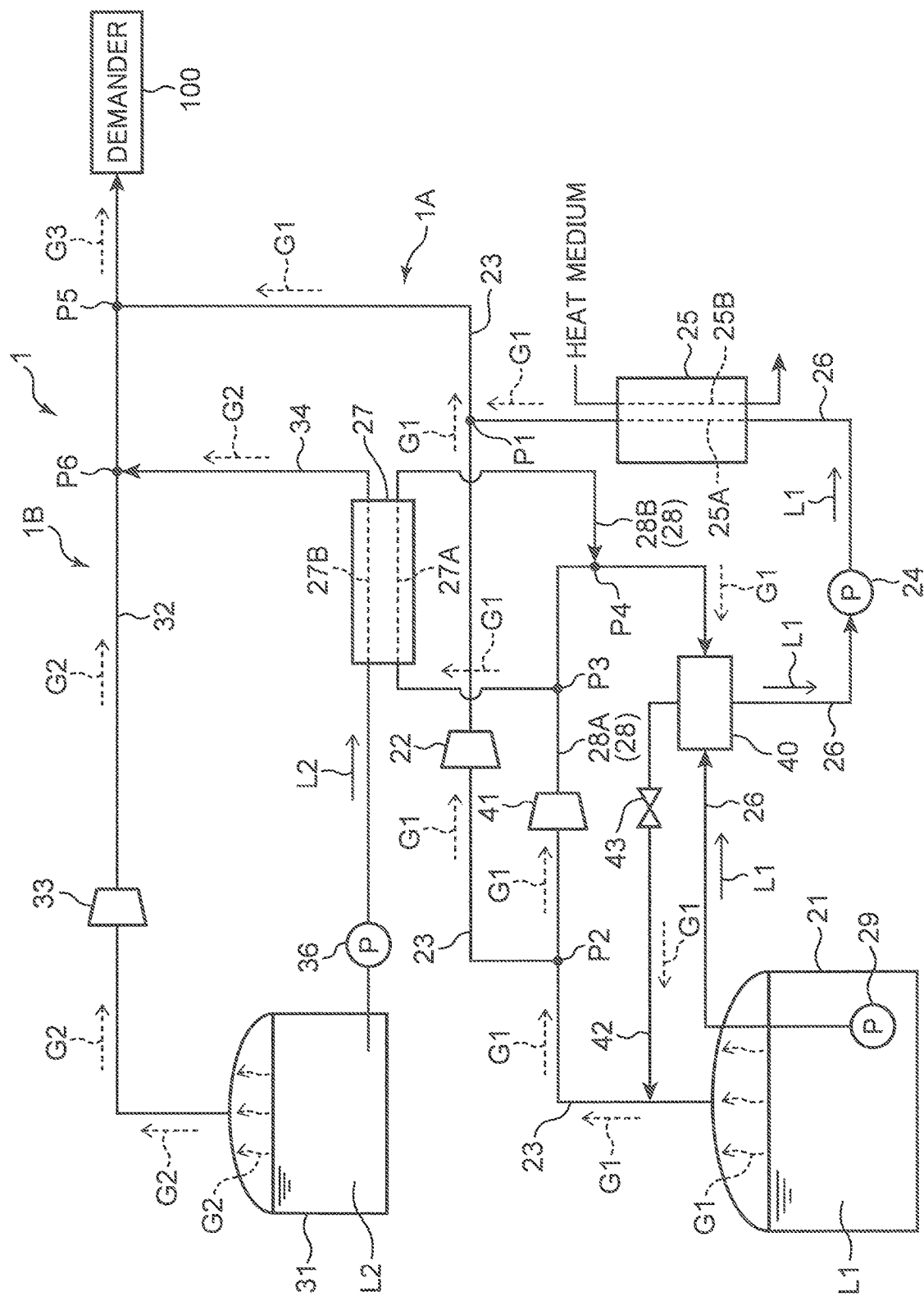
FIG. 1 is a diagram schematically showing a configuration of a gas supply system according to a first embodiment of the present invention.

First, a gas supply system 1 according to a first embodiment of the present invention will be described with reference to FIG. 1. FIG. 1 is a diagram schematically showing main components of the gas supply system 1 according to the first embodiment of the present invention.

The gas supply system 1 is a system that supplies a demander 100 with a mixed gas G3 obtained by mixing a first gas G1 generated by vaporization of a first low-temperature liquefied gas L1 and a second gas G2 generated by vaporization of a second low-temperature liquefied gas L2 that is lower in temperature than the first low-temperature liquefied gas L1. In the present embodiment, the following case is described as one example of the present invention: the first low-temperature liquefied gas L1 is liquefied natural gas (LNG), the first gas G1 is natural gas (NG), the second low-temperature liquefied gas L2 is liquid hydrogen (LH2) and the second gas G2 is hydrogen gas (H2). Note that types of the first and the second low-temperature liquefied gases L1 and L2 and the first and the second gases G1 and G2 are not limited to these gases.

The gas supply system 1 supplies a combustion chamber of a gas turbine generator (demander 100) with the mixed gas G3 obtained by mixing the first gas G1 (natural gas) and the second gas G2 (hydrogen gas) as fuel. Note that the demander 100 to which the mixed gas G3 is supplied is not limited to the combustion chamber of the gas turbine generator.

As shown in FIG. 1, the gas supply system 1 mainly includes a first gas supply unit 1A for supplying the first gas G1 and a second gas supply unit 1B for supplying the second gas G2. Configurations of the first and the second gas supply units 1A and 1B will be described in detail below.

First, the configuration of the first gas supply unit 1A that supplies the first gas G1 (natural gas) will be described. As shown in FIG. 1, the first gas supply unit 1A mainly includes a first tank 21, a first path 23, a second path 26 and a reliquefaction path 28.

The first tank 21 is a tank for storing the first low-temperature liquefied gas L1 (LNG). The first low-temperature liquefied gas L1 is stored in the first tank 21 at a temperature of approximately −162° C. In the first tank 21, part of the first low-temperature liquefied gas L1 vaporizes (evaporates) due to intrusion of external heat or the like, whereby the first gas G1 is generated as boil-off gas.

The first path 23 is a path into which the first gas G1 (boil-off gas) generated in the first tank 21 flows. As shown in FIG. 1, one end of the first path 23 is connected to an upper portion of the first tank 21, and a first gas boosting mechanism 22 configured to boost the first gas G1 to predetermined pressure is disposed in the first path 23. This allows the first gas G1 generated in the first tank 21 to flow into the first path 23 from one end of the first path 23 and to be boosted to predetermined pressure by the first gas boosting mechanism 22.

The first gas boosting mechanism 22 is, for example, a reciprocating compressor, in which a plurality of stages of compression chambers are provided. The first gas G1 is sucked into the compression chambers from a suction port of the first gas boosting mechanism 22 through the first path 23. Then, in each compression chamber, the first gas G1 sucked into a cylinder is boosted by reciprocating motion of a piston, and the boosted first gas G1 is discharged from a discharge port. Note that the first gas boosting mechanism 22 is not limited to the reciprocating compressor, but may be, for example, a turbo compressor.

The second path 26 is a path for extracting the first low-temperature liquefied gas L1 from the first tank 21. As shown in FIG. 1, one end of the second path 26 is connected to a pump 29 disposed in the first tank 21, and the other end of the second path 26 is connected to a part P1 on a downstream side of the first gas boosting mechanism 22 in the first path 23. Also, in the second path 26, a reliquefaction heat exchanger 40, a pump 24 and a vaporization mechanism 25 are disposed in this order from upstream to downstream. That is, the second path 26 includes a portion connecting a discharge port of the pump 29 and an inlet of the reliquefaction heat exchanger 40, a portion connecting an outlet of the reliquefaction heat exchanger 40 and an inlet of the pump 24, a portion connecting an outlet of the pump 24 and an inlet of the vaporization mechanism 25 and a portion connecting an outlet of the vaporization mechanism 25 and the first path 23 (part P1).

The first low-temperature liquefied gas L1 taken into the second path 26 from the first tank 21 passes through the reliquefaction heat exchanger 40 and is then sucked into the pump 24. Then, the first low-temperature liquefied gas L1 is boosted to predetermined pressure by the pump 24 and then discharged from a pump discharge port toward the vaporization mechanism 25.

The vaporization mechanism 25 is a heat exchanger that vaporizes the first low-temperature liquefied gas L1 boosted by the pump 24. As shown in FIG. 1, the vaporization mechanism 25 includes a first flow path 25A through which the first low-temperature liquefied gas L1 discharged from the pump 24 flows and a second flow path 25B through which a predetermined heat medium (for example, seawater) flows. In the vaporization mechanism 25, the first low-temperature liquefied gas L1 flowing through the first flow path 25A and the heat medium flowing through the second flow path 25B exchange heat (the first low-temperature liquefied gas L1 absorbs heat from the heat medium), whereby the first low-temperature liquefied gas L1 is vaporized to generate the first gas G1. After flowing out of the vaporization mechanism 25 (first flow path 25A), the first gas G1 joins the first gas G1 flowing through the first path 23 at the part P1. Note that the vaporization mechanism 25 may be any mechanism as long as the vaporization mechanism 25 vaporizes the first low-temperature liquefied gas L1, and may be, for example, an open rack type LNG vaporizer, a shell & tube type heat exchanger or a plate type heat exchanger.

The reliquefaction path 28 is a path for liquefying at least part of the first gas G1 extracted from an upstream side of the first gas boosting mechanism 22 in the first path 23 and for causing the liquefied first gas G1 to flow into an upstream side of the pump 24 in the second path 26. As shown in FIG. 1, the reliquefaction path 28 includes a main path 28A having one end connected to a part P2 on an upstream side of the first gas boosting mechanism 22 in the first path 23 and the other end in which the reliquefaction heat exchanger 40 is disposed, and a branch path 28B branching from a part P3 in the main path 28A and joining the main path 28A at a part P4 on a downstream side of the part P3.

A reliquefaction gas boosting mechanism 41 configured to boost the first gas G1 extracted from the first path 23 is disposed on an upstream side of the part P3 in the main path 28A. Similarly to the first gas boosting mechanism 22, the reliquefaction gas boosting mechanism 41 is configured by a reciprocating compressor. However, the reliquefaction gas boosting mechanism 41, which is aimed at pumping the first gas G1, has smaller discharge pressure than the first gas boosting mechanism 22.

The reliquefaction heat exchanger 40 is, for example, a direct contact type heat exchanger, and brings the first low-temperature liquefied gas L1 extracted from the first tank 21 through the second path 26 and the first gas G1 flowing through the reliquefaction path 28 into contact with each other to perform heat exchange between the first low-temperature liquefied gas L1 and the first gas G1. Accordingly, the first gas G1 is liquefied by being cooled by the first low-temperature liquefied gas L1. Then, the first low-temperature liquefied gas L1 obtained by this reliquefaction is led to the pump 24 through the second path 26 together with the first low-temperature liquefied gas L1 that is sent from the first tank 21. Note that the reliquefaction heat exchanger 40 is only required to liquefy at least part of the first gas G1, and is not limited to the direct contact type heat exchanger.

As shown in FIG. 1, in the branch path 28B, a cooling heat exchanger 27 for cooling the first gas G1 flowing from the part P3 into the branch path 28B is disposed. The cooling heat exchanger 27 is an important component in the gas supply system 1 according to the present embodiment, which will be described in detail later.

As described above, with the reliquefaction path 28, it is possible to extract the first gas G1 (boil-off gas) from an upstream side of the first gas boosting mechanism 22 in the first path 23 (part P2), and to liquefy at least part of the first gas G1 in the reliquefaction heat exchanger 40. Then, it is possible to cause the liquefied first gas G1 (first low-temperature liquefied gas L1) to flow into an upstream side of the pump 24 in the second path 26.

Not all the first gas G1 flowing into the reliquefaction heat exchanger 40 through the reliquefaction path 28 is liquefied, and part of the first gas G1 remains in a gas state. The first gas G1 that is not liquefied in the reliquefaction heat exchanger 40 is decompressed by an expansion valve 43 and then returned to the first path 23 (upstream side of the part P2) through a return path 42.

Next, the configuration of the second gas supply unit 1B that supplies the second gas G2 (hydrogen gas) will be described. As shown in FIG. 1, the second gas supply unit 1B mainly includes a second tank 31, a third path 32 and a fourth path 34.

The second tank 31 is a tank for storing the second low-temperature liquefied gas L2 (liquid hydrogen). The second low-temperature liquefied gas L2 is stored in the second tank 31 at a temperature of approximately −252° C. In the second tank 31, similarly to the first tank 21, part of the second low-temperature liquefied gas L2 vaporizes (evaporates) due to intrusion of external heat or the like, whereby the second gas G2 (hydrogen gas) is generated.

The third path 32 is a path into which the second gas G2 generated in the second tank 31 flows. As shown in FIG. 1, one end of the third path 32 is connected to an upper portion of the second tank 31, and the other end is connected to the demander 100. A second gas boosting mechanism 33 configured to boost the second gas G2 to predetermined pressure is disposed in the middle of the third path 32. Similarly to the first gas boosting mechanism 22, the second gas boosting mechanism 33 is configured by a multi-stage reciprocating compressor. With this configuration, the second gas G2 generated in the second tank 31 can be supplied to the second gas boosting mechanism 33 through the third path 32, and can be boosted to predetermined pressure by the second gas boosting mechanism 33.

The other end of the first path 23 of the first gas supply unit 1A is connected to a part P5 on a downstream side of the second gas boosting mechanism 33 in the third path 32. Therefore, the first gas G1 and the second gas G2 are mixed at the part P5 to obtain the mixed gas G3, and the mixed gas G3 is sent toward the demander 100.

The fourth path 34 is a path for extracting the second low-temperature liquefied gas L2 stored in the second tank 31. As shown in FIG. 1, one end of the fourth path 34 is immersed in the second low-temperature liquefied gas L2 in the second tank 31, and the other end is connected to a part P6 between the second gas boosting mechanism 33 and the part P5 in the third path 32. Also, a pump 36 for pumping the second low-temperature liquefied gas L2 in the fourth path 34 and the cooling heat exchanger 27 are disposed in the fourth path 34.

The cooling heat exchanger 27 cools the first gas G1 flowing through the reliquefaction path 28 (branch path 28B) through heat exchange with the second low-temperature liquefied gas L2 sent from the second tank 31 (by cold of the second low-temperature liquefied gas L2). As shown in FIG. 1, the cooling heat exchanger 27 includes a first flow path 27A connected to the branch path 28B of the reliquefaction path 28 and a second flow path 27B connected to the fourth path 34. In the first flow path 27A, the first gas G1 flowing from the part P3 to the branch path 28B flows. Meanwhile, in the second flow path 27B, the second low-temperature liquefied gas L2 supplied from the second tank 31 through the fourth path 34 flows.

Therefore, with the cooling heat exchanger 27, the first gas G1 (LNG boil-off gas) flowing through the first flow path 27A is cooled by the second low-temperature liquefied gas L2 (liquid hydrogen) flowing through the second flow path 27B. In other words, by cooling the first gas G1 by using cold of liquid hydrogen, liquefaction efficiency of the first gas G1 in the reliquefaction heat exchanger 40 can be enhanced. Also, with the cooling heat exchanger 27, the second low-temperature liquefied gas L2 flowing through the second flow path 27B can be warmed by the first gas G1 flowing through the first flow path 27A. The second low-temperature liquefied gas L2 vaporizes into the second gas G2 through heat exchange with the first gas G1, and joins the second gas G2 flowing through the third path 32 at the part P6.

Here, features and operational effects of the gas supply system 1 according to the first embodiment described above will be listed.

The gas supply system 1 according to the first embodiment is a system that supplies a demander 100 with a mixed gas G3 obtained by mixing a first gas G1 generated by vaporization of a first low-temperature liquefied gas L1 and a second gas G2 generated by vaporization of a second low-temperature liquefied gas L2 that is lower in temperature than the first low-temperature liquefied gas L1. The gas supply system 1 includes a first tank 21 configured to store the first low-temperature liquefied gas L1, a first path 23 into which the first gas G1 generated by vaporization of the first low-temperature liquefied gas L1 in the first tank 21 flows, a first gas boosting mechanism 22 configured to boost the first gas G1 being disposed in the first path 23, a second path 26 that is a path configured to extract the first low-temperature liquefied gas L1 from the first tank 21, a pump 24 configured to boost the first low-temperature liquefied gas L1 and a vaporization mechanism 25 configured to vaporize the first low-temperature liquefied gas L1 boosted by the pump 24 being disposed in the second path 26 and a reliquefaction path 28 that is a path configured to liquefy at least part of the first gas G1 extracted from an upstream side of the first gas boosting mechanism 22 in the first path 23 and to cause the liquefied first gas G1 to flow into an upstream side of the pump 24 in the second path 26, a cooling heat exchanger 27 configured to cool the first gas G1 by the second low-temperature liquefied gas L2 being disposed in the reliquefaction path 28.

The gas supply system 1 can extract the first gas G1 from the first path 23 to the reliquefaction path 28 before being boosted by the first gas boosting mechanism 22, liquefy at least part of the first gas G1, and then cause the liquefied first gas G1 to flow into the second path 26. Then, the liquefied first gas G1 (first low-temperature liquefied gas L1) can be boosted by the pump 24 and subsequently vaporized by the vaporization mechanism 25. Therefore, when obtaining the first gas G1 boosted to predetermined pressure, it is possible to reduce the amount to be boosted in a gas state and to increase the amount to be boosted in a liquid state. Since boosting in a gas state requires more energy than boosting in a liquid state, the gas supply system 1 can reduce the energy required to obtain the first gas G1 boosted to predetermined pressure.

Moreover, the gas supply system 1 can cool the first gas G1 through heat exchange with the second low-temperature liquefied gas L2 that is lower in temperature than the first low-temperature liquefied gas L1 in the cooling heat exchanger 27. Therefore, the gas supply system 1 can increase liquefaction efficiency of the first gas G1 in the reliquefaction path 28. Therefore, since the amount of the first low-temperature liquefied gas L1 to be flown into the second path 26 through the reliquefaction path 28 can be increased, the efficiency of the gas supply system 1 can be increased.

In the gas supply system 1, a reliquefaction gas boosting mechanism 41 configured to boost the first gas G1 extracted from the first path 23 is disposed in the reliquefaction path 28. This allows the first gas G1 to be pumped in the reliquefaction path 28, enabling the first gas G1 to flow smoothly.

In the gas supply system 1, the cooling heat exchanger 27 is configured to cool the first gas G1 by the second low-temperature liquefied gas L2 and to warm the second low-temperature liquefied gas L2 by the first gas G1. This configuration allows the first gas G1 to be cooled by the cooling heat exchanger 27, and can also promote vaporization of the second low-temperature liquefied gas L2.

In the gas supply system 1, the reliquefaction path 28 is configured to liquefy the first gas G1 through heat exchange with the first low-temperature liquefied gas L1 extracted from the first tank 21. This configuration allows the first gas G1 to be liquefied by using cold of the first low-temperature liquefied gas L1 stored in the first tank 21. Therefore, it is possible to make the system simple as compared to the case where another refrigerant is used for liquefying the first gas G1.

Other Embodiments

Finally, other embodiments of the present invention will be described.

Figure 2:
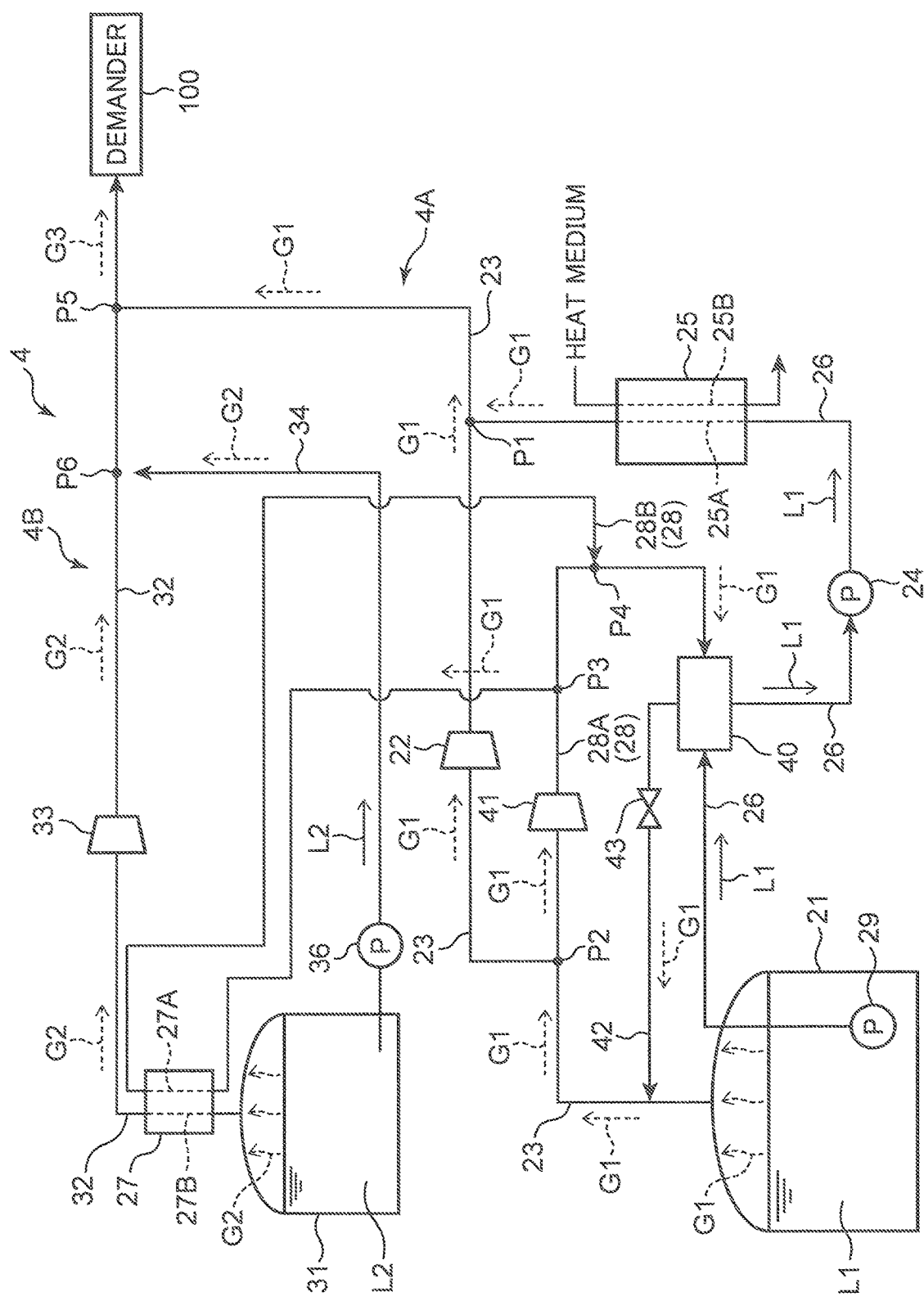
FIG. 2 is a diagram schematically showing a configuration of a gas supply system according to other embodiments of the present invention.

The first embodiment has described a case of cooling the first gas G1 (boil-off gas) with the cooling heat exchanger 27 by using cold of the second low-temperature liquefied gas L2 (liquid hydrogen), but the present invention is not limited to this case. As shown in FIG. 2, the second flow path 27B of the cooling heat exchanger 27 may be connected to the third path 32 (path on an upstream side of the second gas boosting mechanism 33). In this case, the second gas G2 generated by vaporizing the second low-temperature liquefied gas L2 in the second tank 31 flows into the cooling heat exchanger 27 (second flow path 27B) through the third path 32. Then, the first gas G1 (natural gas) flowing through the reliquefaction path 28 (branch path 28B) can be cooled by cold of the second gas G2 (hydrogen gas). In this case, in order to cause the second gas G2 to flow into the second flow path 27B of the cooling heat exchanger 27, a boosting mechanism for boosting the second gas G2 may be disposed between the second tank 31 and the cooling heat exchanger 27 in the third path 32.

The reliquefaction gas boosting mechanism 41 is configured by one compressor and includes a plurality of stages of compression chambers. However, the present invention is not limited to this configuration, and the reliquefaction gas boosting mechanism 41 may include a plurality of compressors.

The first embodiment has described a case where the reliquefaction path 28 includes the branch path 28B, but the present invention is not limited to this case. The reliquefaction path 28 may be configured by only the main path 28A, and the main path 28A may be connected to the first flow path 27A of the cooling heat exchanger 27.

Note that the outline of the above embodiments is as follows.

The gas supply system according to the embodiment supplies a demander with a mixed gas obtained by mixing a first gas generated by vaporization of a first low-temperature liquefied gas and a second gas generated by vaporization of a second low-temperature liquefied gas that is lower in temperature than the first low-temperature liquefied gas. The gas supply system includes a first tank configured to store the first low-temperature liquefied gas, a first path into which the first gas generated by the vaporization of the first low-temperature liquefied gas in the first tank flows, a gas boosting mechanism configured to boost the first gas being disposed in the first path, a second path that is a path configured to extract the first low-temperature liquefied gas from the first tank, a pump configured to boost the first low-temperature liquefied gas and a vaporization mechanism configured to vaporize the first low-temperature liquefied gas boosted by the pump being disposed in the second path and a reliquefaction path that is a path configured to liquefy at least part of the first gas extracted from an upstream side of the gas boosting mechanism in the first path and to cause the liquefied first gas to flow into an upstream side of the pump in the second path, a cooling heat exchanger configured to cool the first gas by the second low-temperature gas or the second gas being disposed in the reliquefaction path.

The gas supply system can extract the first gas from the first path to the reliquefaction path before being boosted by the gas boosting mechanism, liquefy at least part of the first gas, and then cause the liquefied first gas to flow into the second path. Then, the liquefied first gas (first low-temperature liquefied gas) can be boosted by the pump and subsequently vaporized by the vaporization mechanism. Therefore, when obtaining the first gas boosted to predetermined pressure, it is possible to reduce the amount to be boosted in a gas state and to increase the amount to be boosted in a liquid state. Since boosting in a gas state requires more energy than boosting in a liquid state, the gas supply system can reduce the energy required to obtain the first gas boosted to predetermined pressure.

Moreover, the gas supply system can cool the first gas through heat exchange with the second low-temperature liquefied gas (or the second gas generated by vaporization of the second low-temperature liquefied gas) that is lower in temperature than the first low-temperature liquefied gas in the cooling heat exchanger. Therefore, the gas supply system can increase liquefaction efficiency of the first gas in the reliquefaction path. Therefore, since the amount of the first low-temperature liquefied gas to be flown into the second path through the reliquefaction path can be increased, the efficiency of the gas supply system can be increased.

In the gas supply system, a reliquefaction gas boosting mechanism configured to boost the first gas extracted from the first path may be disposed in the reliquefaction path.

This configuration allows the first gas to be pumped in the reliquefaction path, enabling the first gas to flow smoothly.

In the gas supply system, the cooling heat exchanger may be configured to cool the first gas by the second low-temperature liquefied gas and to warm the second low-temperature liquefied gas by the first gas.

This configuration allows the first gas to be cooled by the cooling heat exchanger, and can also promote vaporization of the second low-temperature liquefied gas.

In the gas supply system, the reliquefaction path may be configured to liquefy the first gas through heat exchange with the first low-temperature liquefied gas extracted from the first tank.

This configuration allows the first gas to be liquefied by using cold of the first low-temperature liquefied gas stored in the first tank. Therefore, it is possible to make the system simple as compared to the case where another refrigerant is used for liquefying the first gas.

The embodiments disclosed herein are to be considered in all respects as illustrative and not restrictive. The scope of the present invention is indicated by the appended claims rather than by the foregoing description, and all changes which come within the meaning and scope of the claims and equivalents are therefore intended to be embraced therein.

This application is based on Japanese Patent application No. 2018-106142 filed in Japan Patent Office on Jun. 1, 2018 the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A gas supply system that supplies a demander comprising:

a mixed gas obtained by mixing a first gas generated by vaporization of a first low-temperature liquefied gas and a second gas generated by vaporization of a second low-temperature liquefied gas that is lower in temperature than the first low-temperature liquefied gas;

a first tank configured to store the first low-temperature liquefied gas;

a first path into which the first gas generated by vaporization of the first low-temperature liquefied gas in the first tank flows, a gas boosting mechanism configured to boost the first gas being disposed in the first path;

a second path that is a path configured to extract the first low-temperature liquefied gas from the first tank, a pump configured to boost the first low-temperature liquefied gas and a vaporization mechanism configured to vaporize the first low-temperature liquefied gas boosted by the pump being disposed in the second path; and a reliquefaction path that is a path configured to liquefy at least part of the first gas extracted from an upstream side of the gas boosting mechanism in the first path and to cause the liquefied first gas to flow into an upstream side of the pump in the second path, a cooling heat exchanger configured to cool the first gas by the second low-temperature liquefied gas or the second gas being disposed in the reliquefaction path.

2. The gas supply system according to claim 1, wherein a reliquefaction gas boosting mechanism configured to boost the first gas extracted from the first path is disposed in the reliquefaction path.

3. The gas supply system according to claim 1, wherein the cooling heat exchanger is configured to cool the first gas by the second low-temperature liquefied gas and to warm the second low-temperature liquefied gas by the first gas.

4. The gas supply system according to claim 1, wherein the reliquefaction path is configured to liquefy the first gas through heat exchange with the first low-temperature liquefied gas extracted from the first tank.

* * * * *